(12) United States Patent
Shan et al.

(10) Patent No.: US 12,179,830 B2
(45) Date of Patent: Dec. 31, 2024

(54) STROLLER AND BASKET ENGAGEMENT MECHANISM

(71) Applicant: WONDERLAND SWITZERLAND AG, Steinhausen (CH)

(72) Inventors: Linhai Shan, Guangdong (CN); Xiuping Fu, Guangdong (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 17/849,094

(22) Filed: Jun. 24, 2022

(65) Prior Publication Data
US 2022/0410961 A1 Dec. 29, 2022

(30) Foreign Application Priority Data
Jun. 25, 2021 (CN) .......................... 202110711071.2

(51) Int. Cl.
*B62B 9/26* (2006.01)
(52) U.S. Cl.
CPC ...................................... *B62B 9/26* (2013.01)
(58) Field of Classification Search
CPC ............... B62B 9/26; B62B 9/12; B62B 9/00
See application file for complete search history.

(56) References Cited

U.S. PATENT DOCUMENTS

| | | | | |
|---|---|---|---|---|
| 4,953,887 A | * | 9/1990 | Takahashi | B62B 7/08 280/47.38 |
| 6,139,046 A | * | 10/2000 | Aalund | B62B 9/20 280/47.38 |
| 6,152,340 A | * | 11/2000 | Chen | B62B 9/26 224/430 |
| 8,651,502 B2 | * | 2/2014 | Winterhalter | B62B 7/006 280/643 |
| 8,657,326 B2 | * | 2/2014 | Shaanan | B62B 9/102 280/47.38 |
| 8,807,588 B2 | * | 8/2014 | Thomas | B62B 7/06 280/643 |

(Continued)

FOREIGN PATENT DOCUMENTS

| CN | 105966447 B | 2/2018 |
|---|---|---|
| TW | 201102300 A | 1/2011 |

OTHER PUBLICATIONS

Office Action issued in corresponding Taiwanese Application No. 111123918 dated Aug. 4, 2023.
(Continued)

*Primary Examiner* — James M Dolak
(74) *Attorney, Agent, or Firm* — Volpe Koenig

(57) ABSTRACT

The present application discloses a basket clamping mechanism for connecting a basket of a stroller to a frame of the stroller. The basket clamping mechanism comprising: a clamping member, which is connected to the basket; a clamping base, which is detachably connected with the clamping member and is clamped with the frame. The present application further discloses a stroller including the basket clamping mechanism. The basket clamping mechanism of the present application has good adaptability, simple disassembly operation, good user operation experience and high satisfaction, as well as reliable fixation and good stability, particularly to well ensure the stability of the basket after loading items, and will not fall.

21 Claims, 22 Drawing Sheets

(56) References Cited

U.S. PATENT DOCUMENTS

| | | | | |
|---|---|---|---|---|
| 8,851,505 B2 * | 10/2014 | Van Gelderen | ......... | B62B 7/142 |
| | | | | 280/658 |
| 9,517,791 B1 * | 12/2016 | Hawk | ....................... | B62B 9/26 |
| 9,545,941 B2 * | 1/2017 | Pacella | .................... | B62B 7/145 |
| 9,650,063 B2 * | 5/2017 | Hawk | ....................... | B62B 9/26 |
| 9,840,168 B2 * | 12/2017 | Yi | ........................... | B62B 7/142 |
| 10,053,131 B2 * | 8/2018 | Ruggiero | ................. | B62B 7/064 |
| 11,731,681 B2 * | 8/2023 | Eggert-Crowe | ........ | B62B 7/008 |
| | | | | 280/47.38 |
| 12,017,697 B2 * | 6/2024 | Li | ........................... | B62B 9/102 |
| 12,024,217 B2 * | 7/2024 | Yi | ............................ | B62B 7/14 |
| 12,060,101 B2 * | 8/2024 | Su | ............................. | B62B 9/12 |
| 2002/0093178 A1 * | 7/2002 | Turner | ..................... | B62B 9/20 |
| | | | | 280/658 |
| 2002/0109321 A1 * | 8/2002 | Turner | ..................... | B62B 9/26 |
| | | | | 280/47.38 |
| 2005/0242139 A1 * | 11/2005 | Li | ........................... | B62K 9/02 |
| | | | | 224/431 |

OTHER PUBLICATIONS

Taiwanese Office Action for Application No. 111123918 dated Mar. 10, 2023.

* cited by examiner

STROLLER AND BASKET ENGAGEMENT MECHANISM

TECHNICAL FIELD

The present disclosure relates to a stroller, in particular to a stroller with a detachable basket. The present disclosure further relates to a basket clamping mechanism of a stroller.

BACKGROUND

A stroller is a tool for a baby or child (hereinafter referred to as "baby") to ride and move the baby conveniently. The stroller can be equipped with a basket to carry baby and other items at the same time.

The existing basket is generally fixed on a frame, and a clamping mechanism on the basket cannot be disassembled and replaced, which is not designed to be used with other frames, so can only clamp with a single type of frame.

Therefore, there is a need for a stroller that can be easily installed and disassembled the basket. There is also a need for a basket clamping mechanism that can adapt to different types of frames.

SUMMARY

An object of the present application is to provide a stroller which is convenient for installing and disassembling a basket.

Another object of the present disclosure is to provide a detachable basket clamping mechanism.

In order to achieve the above objects, on the one hand, the present application provides a basket clamping mechanism for connecting a basket of a stroller to a frame of the stroller, the basket clamping mechanism including: a clamping member, which is connected to the basket; a clamping base, which is detachably connected with the clamping member and is clamped with the frame.

In one embodiment, the clamping member includes a locking member, the clamping base includes a locking hole, the locking hole is able to clamp with the locking member, and when the locking hole is clamped with the locking member, the locking member is located in the locking hole.

In one embodiment, the locking member is able to be actuated inward to disengage the locking hole from the locking member.

In one embodiment, the clamping base further includes a first operating member, which extends away from the locking hole and is able to be actuated outward to disengage the locking hole from the locking member.

In one embodiment, the clamping member further includes a cantilever, and the locking member is formed at a free end of the cantilever.

In one embodiment, the clamping member further includes an elastic member, which is provided on the inner side of the locking member to apply a restoring force to the locking member outwardly.

In one embodiment, the clamping member includes a fixing part, the clamping base includes a clamping groove, the clamping groove clamps with the fixing part to prevent the clamping member from moving in a first direction relative to the clamping base, and the locking hole is able to clamp with the locking member to prevent the clamping member from moving in a second direction and a third direction relative to the clamping base, the first direction, the second direction and the third direction being perpendicular to each other.

In one embodiment, the clamping groove is clamped with the fixing part by sliding on the fixing part.

In one embodiment, the basket includes a basket support, and the sliding is in an extension direction of the basket support.

In one embodiment, the clamping groove is directly buckled on the outside of the fixing part.

In one embodiment, the clamping member includes a clamping groove, the clamping base includes a fixing part, the clamping groove clamps with the fixing part to prevent the clamping member from moving in a first direction relative to the clamping base, and the locking hole is able to clamp with the locking member to prevent the clamping member from moving in a second direction and a third direction relative to the clamping base, the first direction, the second direction and the third direction being perpendicular to each other.

In one embodiment, the clamping base further includes a second operating member, the frame includes a fixing base, and the second operating member is able to be inserted into the fixing base and clamped with a clamping hole of the fixing base.

In one embodiment, the second operating member includes an operating button, a clamping part and a pivot shaft located between the operating button and the clamping part, so that actuating the operating button is able to clamp or disengage the clamping part with/from the clamping hole.

In one embodiment, the second operating member slides into the fixing base in a vertical direction.

In one embodiment, the second operating member slides into the fixing base in a direction inclined relative to a vertical direction.

In one embodiment, the basket includes a basket support and a flexible containing part, the basket support being shaped into a ring shape, the containing part being formed below the basket support.

In one embodiment, the clamping member includes a fixing part, and more than one position of which is able to be detachably connected to the basket support.

In one embodiment, the fixing part is connected to the basket support through a pull nail.

In one embodiment, a storage bag is formed on an outside of the containing part.

In one embodiment, the basket clamping mechanism includes two types of clamping bases, and the frame includes two types of frames, one of the two types of clamping bases being connected with the clamping member so as to clamp with one of the two types of frames, or the other of the two types of clamping bases being connected with the clamping member so as to clamp with the other of the two types of frames, wherein, each of the two types of clamping bases includes two clamping bases, and the clamping members are two clamping members.

On the other hand, the present application provides a stroller, the stroller includes a frame, a basket and the basket clamping mechanism as described above.

In one embodiment, the stroller includes two basket clamping mechanisms, and the two basket clamping mechanisms are connected to both sides of the basket respectively.

In the present application, by setting multiple detachable clamping mechanisms with the basket, the multiple clamping mechanisms are replaced with each other to complete the clamping with different types of frames, so as to realize the clamping use of one basket with various types of frames, improve the adaptability of the basket clamping, and the clamping mechanism has simple disassembly operation, good user operation experience and high satisfaction, as well as reliable fixation and good stability, particularly to well ensure the stability of the basket after loading items, and will not fall.

BRIEF DESCRIPTION OF THE DRAWINGS

By considering the following detailed description of the preferred embodiments of the present disclosure in combination with the accompanying drawings, various objects, features and advantages of the present disclosure will become more apparent. The drawings are only exemplary illustrations of the present disclosure and are not necessarily drawn to scale. In the drawings, the same reference numerals always represent the same or similar components, wherein.

LIST OF REFERENCE NUMBERS

Figure 1:
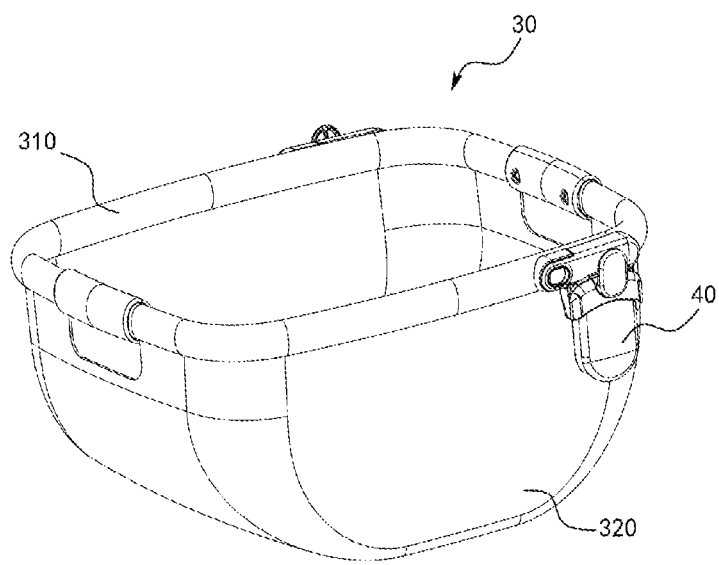
FIG. 1 is a perspective view of a basket and a basket clamping mechanism of a stroller of one embodiment of the present application.

Stroller 1
　Frame 10
　　Fixing base 110
　　　Clamping hole 111
　Wheel 20
　Basket 30
　　Basket support 310
　　Containing part 320
　　　Storage bag 321
　Basket clamping mechanism 40
　　Clamping member 410
　　　Fixing part 411
　　　Locking member 412
　　　Cantilever 413
　　　Elastic member 415
　　　Support cover 416
　　Clamping base 420
　　　Clamping groove 421
　　　Locking hole 422
　　　First operating member 423
　　　Second operating member 424
　　　　Operating button 4241
　　　　Clamping part 4242
　　　Insertion part 425
　　　Pivot hole 426

DETAILED DESCRIPTION

In order to further explain the principle and structure of the present application, the preferred embodiments of the present application are described in detail in combination with the accompanying drawings. However, the embodiments are only for illustration and explanation, and cannot be used to limit the scope of patent protection of the present application.

The terms used in the present application are for the purpose of describing the specific embodiments only, and are not intended to limit the present application. The singular forms "a", "the" and "said" used in the present application and the appended claims are also intended to include plural forms, unless the context clearly indicates other meanings. It should also be understood that the term "and/or" as used herein refers to and includes any or all possible combinations of one or more associated listed items.

Figure 2:
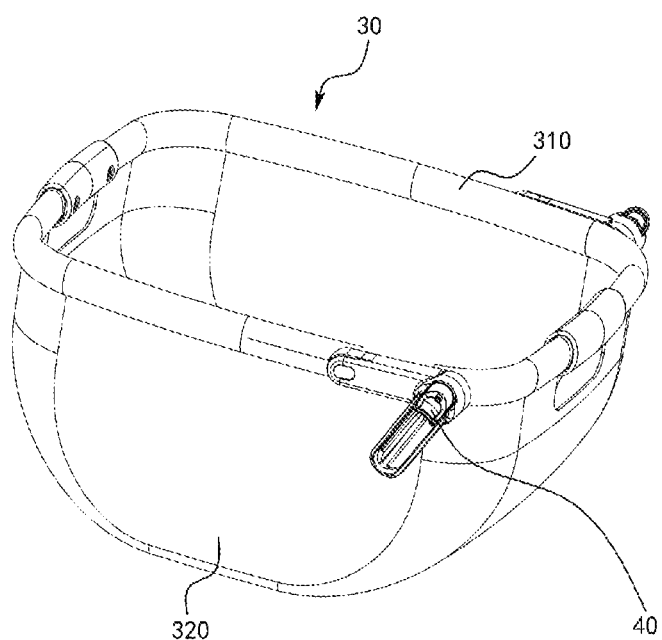
FIG. 2 is a perspective view of a basket and a basket clamping mechanism of a stroller of another embodiment of the present application.
Figure 3:
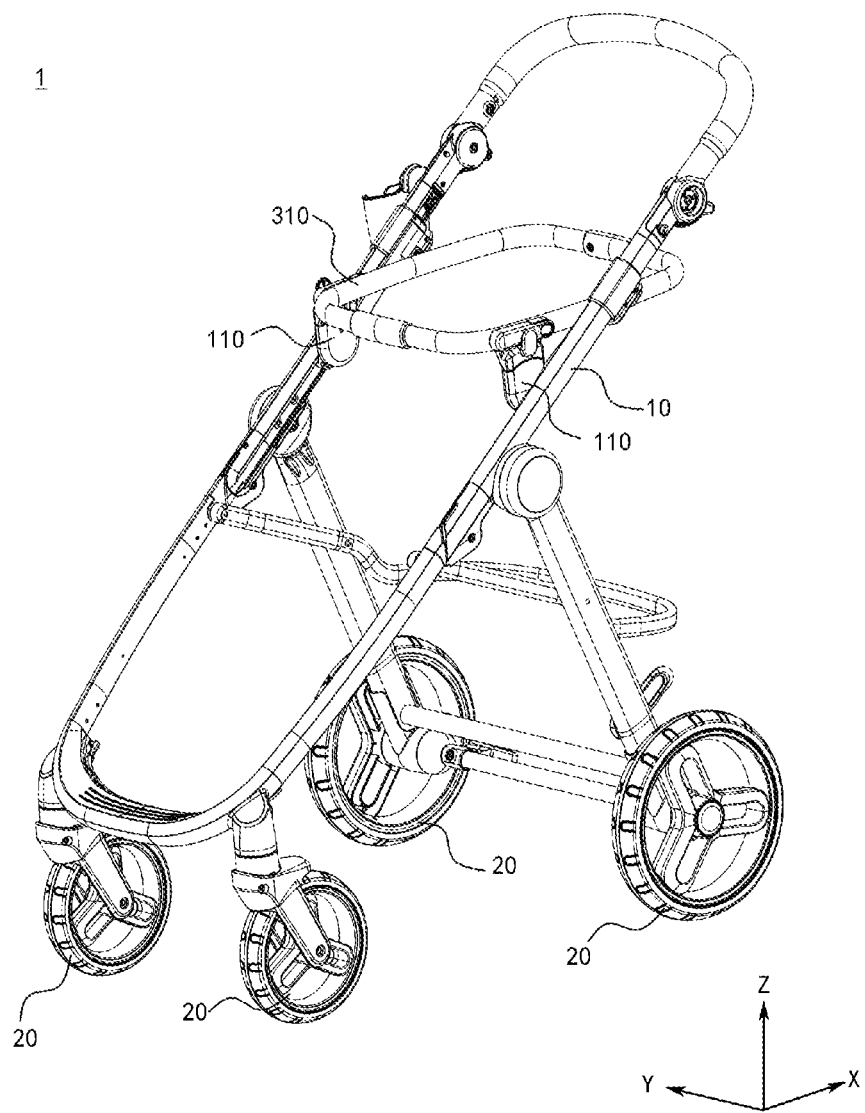
FIG. 3 is a perspective view of a stroller of one embodiment of the present application, in which a containing part of a basket is removed.

Referring to FIGS. 1-3, a stroller 1 of the present application may include a frame 10, a basket 30, and a basket clamping mechanism 40. The frame 10 is optionally provided with a wheel 20. The stroller 1 is foldable for storage. The basket 30 may be used to store items.

Figure 17:
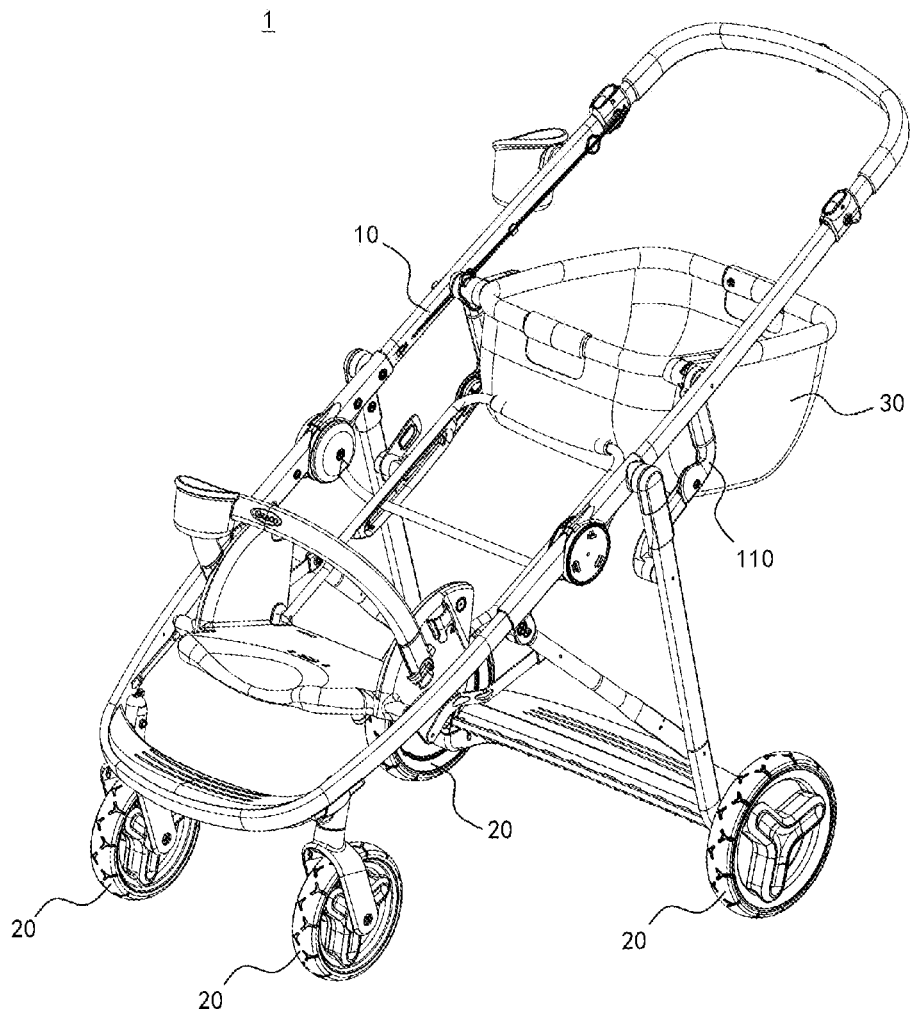
FIG. 17 is a perspective view of a stroller of another embodiment of the present application.
Figure 18:
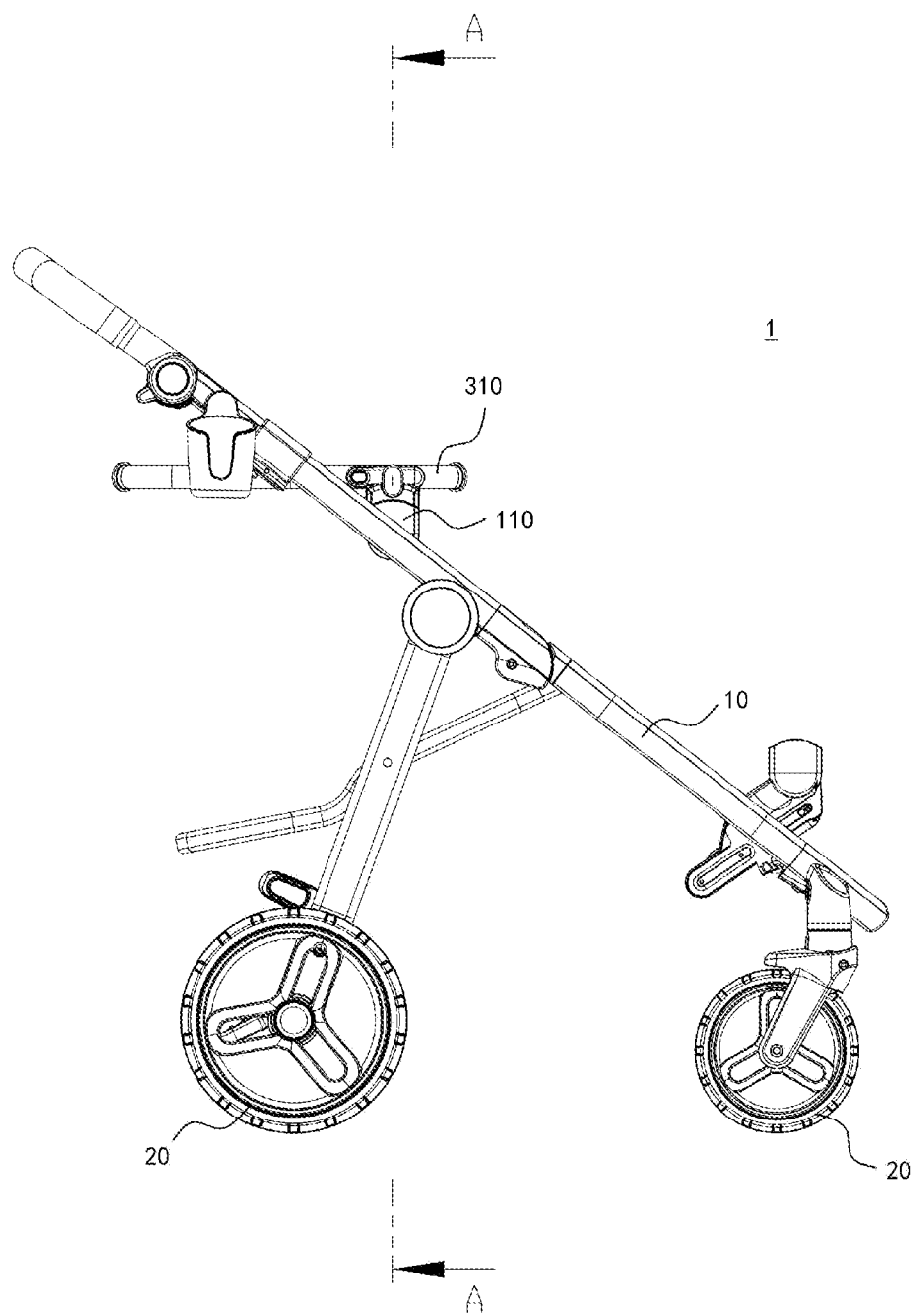
FIG. 18 is a side view of a stroller of one embodiment of the present application, in which a containing part of a basket is removed.
Figure 19:
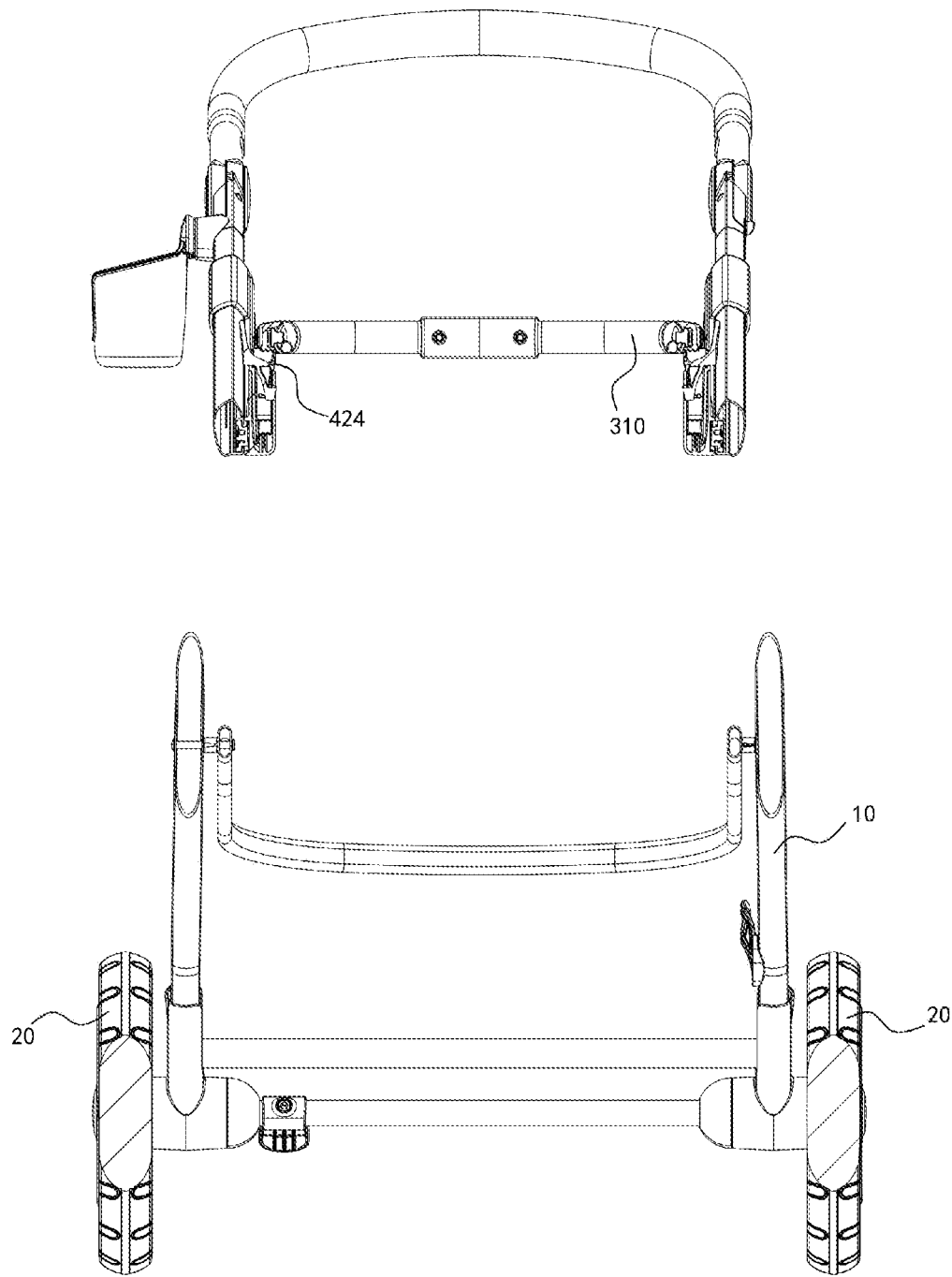
FIG. 19 is a sectional view taken along a line A-A of FIG. 18.

The basket clamping mechanism 40 may be used to connect the basket 30 of the stroller 1 to the frame 10 of the stroller 1, and the basket 30 may be disassembled from the stroller 1 by a simple operation. The basket clamping mechanism 40 may be applied to the frame 10 of different types of strollers 1 (such as two types of strollers as shown in FIG. 3 and FIG. 17 respectively).

Referring to FIGS. 1-2, a basket 30 may include a basket support 310 and a containing part 320. The basket support 310 may be shaped into a ring shape, such as a basically rectangular ring shape with corners chamfered to avoid danger to infants or users. The basket support 310 may be formed of a metal tube. The containing part 320 is formed below the basket support 310 and may be a flexible structure, such as a net bag.

A basket clamping mechanism 40 may be fixed to an outside of the basket support 310. The present application does not limit the number of the basket clamping mechanism 40. Preferably, two basket clamping mechanisms 40 are respectively arranged on both sides of the basket support 310. As shown in FIGS. 1-2, the basket clamping mechanism 40 may have different members to adapt to different frames 10.

The first embodiment of the present application will be described below.

Figure 4:
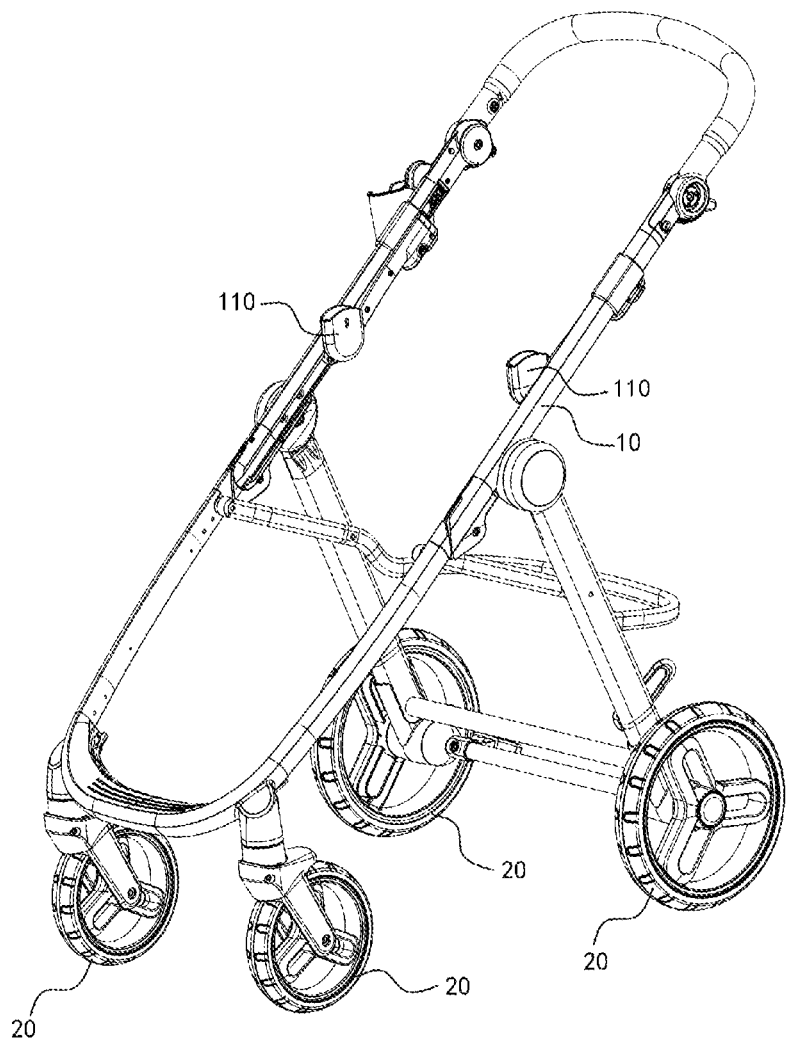
FIG. 4 is a perspective view of a frame of a stroller of one embodiment of the present application.
Figure 5:
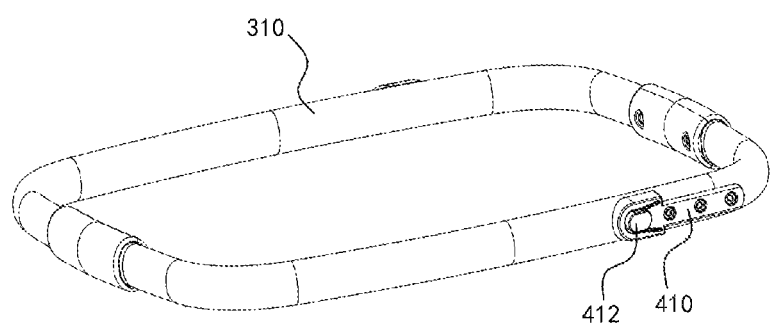
FIG. 5 is a perspective view of some components of a stroller of one embodiment of the present application.

Referring to FIG. 4, a fixing base 110 may be formed on a frame 10. For example, the fixing base 110 may be arranged at a higher position to facilitate the placing and taking out of articles. The fixing base 110 may have a number and a position corresponding to the basket clamping mechanism 40. At least a portion of the basket clamping mechanism 40 may be inserted into the fixing base 110 and clamped with the fixing base 110, so as to stably fix a basket 30 to the frame 10. The fixing base 110 may be arranged substantially perpendicular to the ground.

Referring to FIGS. 5-9, in an embodiment of the present disclosure, a basket clamping mechanism 40 may include: a clamping member 410 which is connected to the basket 30; a clamping base 420 which is detachably connected with the clamping member 410 and clamped with the frame 10. The clamping member 410 may include a locking member 412. The clamping base 420 may include a locking hole 422. The locking hole 422 may be clamped with the locking member 412. When the locking hole 422 is clamped with the locking member 412, the locking member 412 may be located in the locking hole 422.

Figure 9:
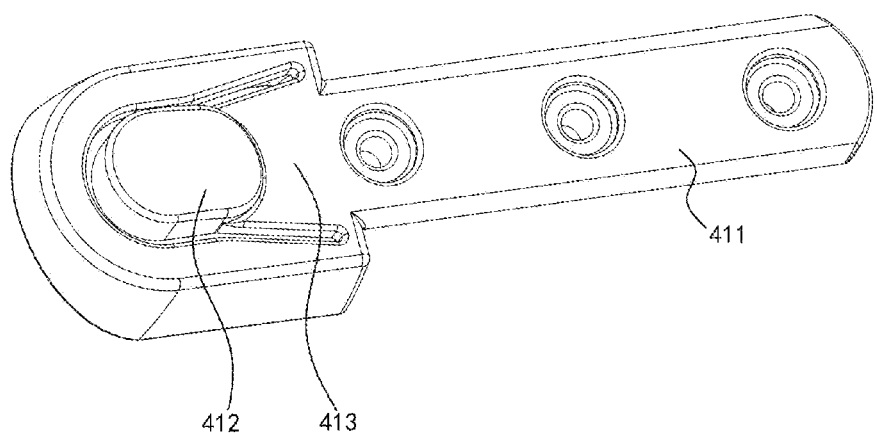
FIG. 9 is a perspective view of a clamping member of one embodiment of the present application.

Referring to FIG. 9, a clamping member 410 may include a cantilever 413. A locking member 412 is formed at a free end of the cantilever 413. The clamping member 410 may include a fixing part 411. The fixing part 411 may be formed with three holes. The clamping member 410 may be fixed or connected to a basket support 310 with pull nails through the three holes. The fixing part 411 may have another number of holes, such as one, two or more than three, and the number of holes is not limited in the present application. The clamping member 410 may also be connected to the basket support 310 by other means, and the connection method is not limited in the present application.

Figure 6:
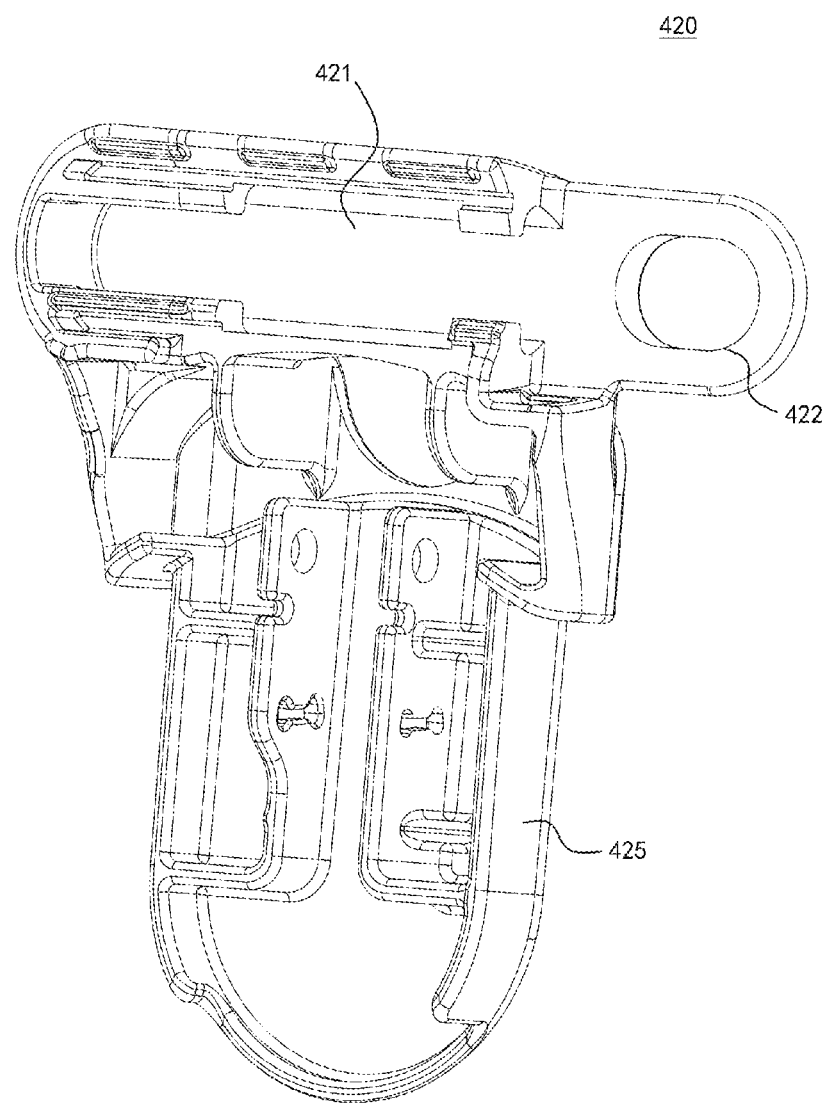
FIG. 6 is a perspective view of some components of a clamping base of one embodiment of the present application.
Figure 7:
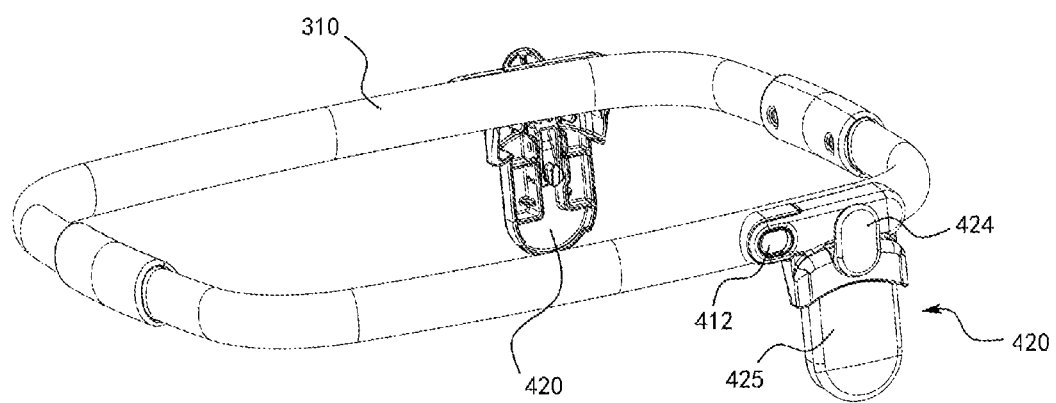
FIG. 7 is a perspective view of a basket support and a basket clamping mechanism of a stroller of one embodiment of the present application.

Referring to FIGS. 6 to 7, a clamping base 420 may include a clamping groove 421, a locking hole 422, a second operating member 424, and an insertion part 425. The clamping groove 421 may be formed on a side of the locking hole 422 and has an elongage shape corresponding to a fixing part 411. The insertion part 425 may be formed below the clamping groove 421. An extension direction of the insertion part 425 may be substantially perpendicular to an extension direction of the clamping groove 421.

Figure 8:
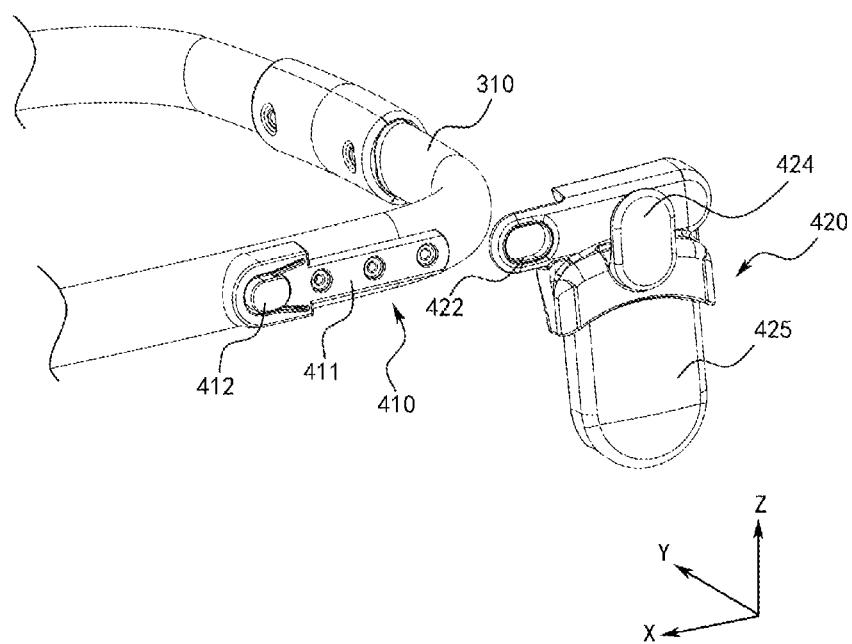
FIG. 8 is a partial perspective exploded view of a basket support and a basket clamping mechanism of a stroller of one embodiment of the present application.

Referring to FIG. 8, a clamping base 420 may slide on a fixing part 411 in an X-axis direction (i.e., a positive direction of the X-axis or a first direction), so that the fixing part 411 is inserted into a clamping groove 421. As shown in FIG. 8, a long side of a basket support 310 is parallel to the X axis, a short side of the basket support 310 is parallel to a Y axis, and a Z axis is perpendicular to the X axis and the Y axis. In this process, a locking member 412 is pressed by a peripheral part of a locking hole 422 and moves inward in the Y-axis direction (which may be referred to as a second direction), causing deformation of the cantilever 413 and storage of restore energy. The clamping base 420 continues to move in the X-axis direction until the fixing part 411 is completely in the locking hole 422. At this time, since the clamping base 420 no longer presses the locking member 412, the locking member 412 returns to an original position due to restoring force of the cantilever 413. In this way, clamping (locking fit) of the clamping base 420 and the locking member 412 is completed. At this time, since the fixing part 411 is located in the clamping groove 421, the fixing part 411 prevents the clamping base 420 from moving in a direction other than the X-axis. At the same time, since the locking member 412 is located in the locking hole 422, the fixing part 411 prevents the clamping base 420 from moving in any direction in a plane formed by the X-axis and the Z-axis (the Z-axis direction may also be referred to as a third direction). Therefore, the clamping member 410 is fixed relative to the clamping base 420.

Alternatively, the clamping base 420 is directly buckled (i.e., in a way of buckle cover) on an outside of the clamping member 410 in the Y-axis direction (i.e., a positive direction of the Y-axis). This way is easier to be operated.

Alternatively, the fixing part 411 may be formed on the clamping base 420, and the clamping groove 421 may be formed on the clamping member 410, that is, the positions of the fixing part 411 and the clamping groove 421 are exchanged.

Continuing to refer to FIG. 8, when it is necessary to disengage the clamping member 410 from the clamping base 420, the locking member 412 may be pushed inward (for the clamping member 410 in a right side of FIG. 8, the inner side is in the positive direction of the Y-axis, while for the clamping member 410 in a left side of FIG. 8, the inner side is in a negative direction of the Y-axis; in other words, the inner side refers to a direction close to middle of the basket support 310), so that the fixing part 411 no longer prevents the clamping base 420 from moving in any direction in a plane formed by the X-axis and the Z-axis. At the same time, the clamping base 420 is moved in a negative direction of the X-axis, so that the fixing part 411 slides away from the clamping groove 421, causing the clamping member 410 disengaged from the clamping base 420.

The locking and unlocking method of this embodiment has a simple structure which may be integrally formed with a low cost.

Figure 20:
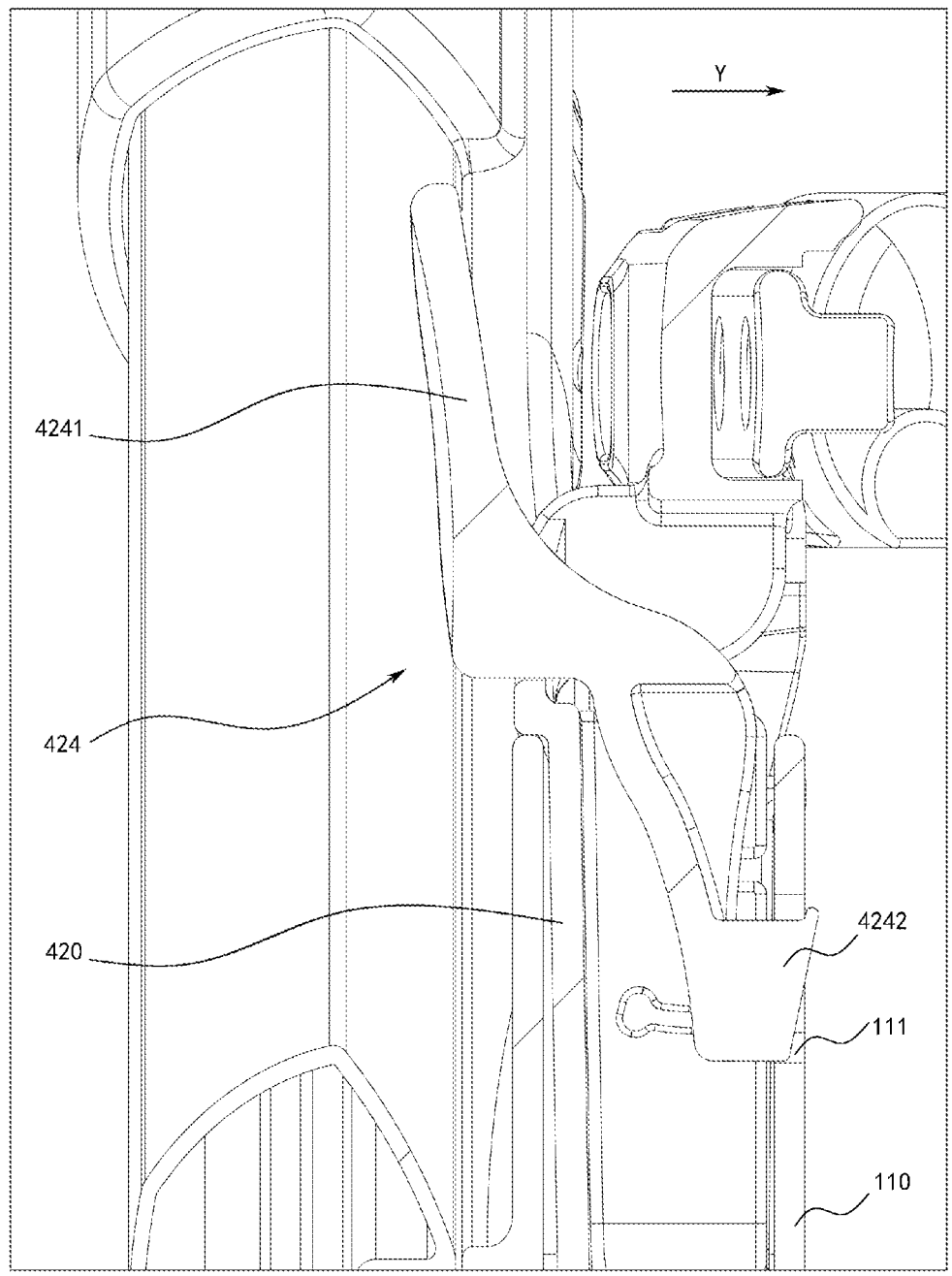
FIG. 20 is a partial enlarged view of FIG. 19.
Figure 21:
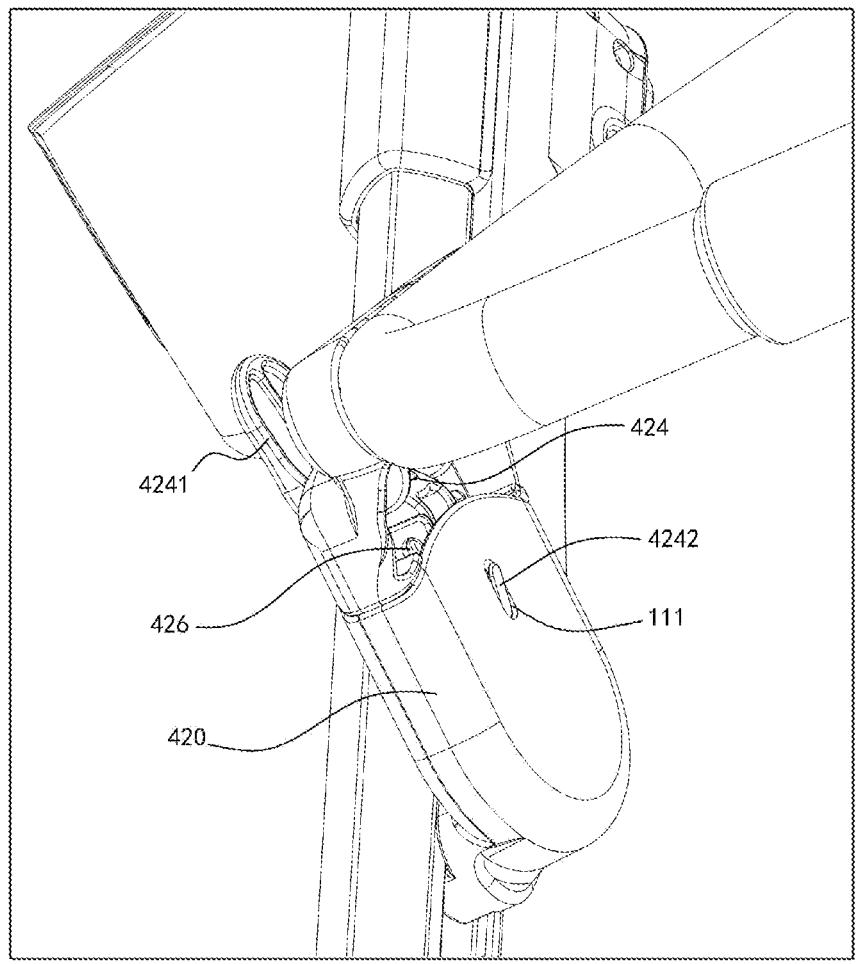
FIG. 21 is a partial perspective view of a stroller of one embodiment of the present application.

Referring to FIGS. 6-8 and FIGS. 18-21, a fixing base 110 may be formed with a containing cavity, and a second operating member 424 may be slidably inserted into the containing cavity of the fixing base 110. The second operating member 424 may include an operating button 4241 and a clamping part 4242. The second operating member 424 may have a pivot shaft (not shown) located between the operating button 4241 and the clamping part 4242. The clamping base 420 may be provided with a pivot hole 426. The pivot shaft is arranged in the pivot hole 426, so that actuating the operating button 4241 may pivot the second operating member 424, and clamp or disengage the clamping part 4242 with/from a clamping hole 111. The clamping base 420 may be provided with an elastic restoring member (not shown) so that the clamping part 4242 tends to protrude outside an insertion part 425. When the insertion part 425 of the clamping base 420 is inserted into the fixing base 110, since a width of the containing cavity is slightly smaller than an overall width of the insertion part 425 and the clamping part 4242, an inner wall of the containing cavity overcomes elastic force of the elastic restoring member to actuate the clamping part 4242. As shown in FIG. 20, when the insertion part 425 is inserted into place, the clamping part 4242 is just located at the clamping hole 111. At this time, the clamping part 4242 is not blocked by the inner wall of the containing cavity, so it is pushed out of the clamping hole 111 by the elastic restoring member so as to realize clamping. A distal end of the clamping part 4242 may be formed into a hook shape to make the clamping firmer. In this way, the clamping of the clamping base 420 and the frame 10 is completed.

Continuing to refer to FIG. 20, when it is necessary to disengage the clamping base 420 from the frame 10, the operating button 4241 is pushed inward to make the clamping part 4242 enter into the containing cavity of the fixing base 110, and the clamping base 420 is lifted to be moved upwardly to leave the containing cavity.

Figure 10:
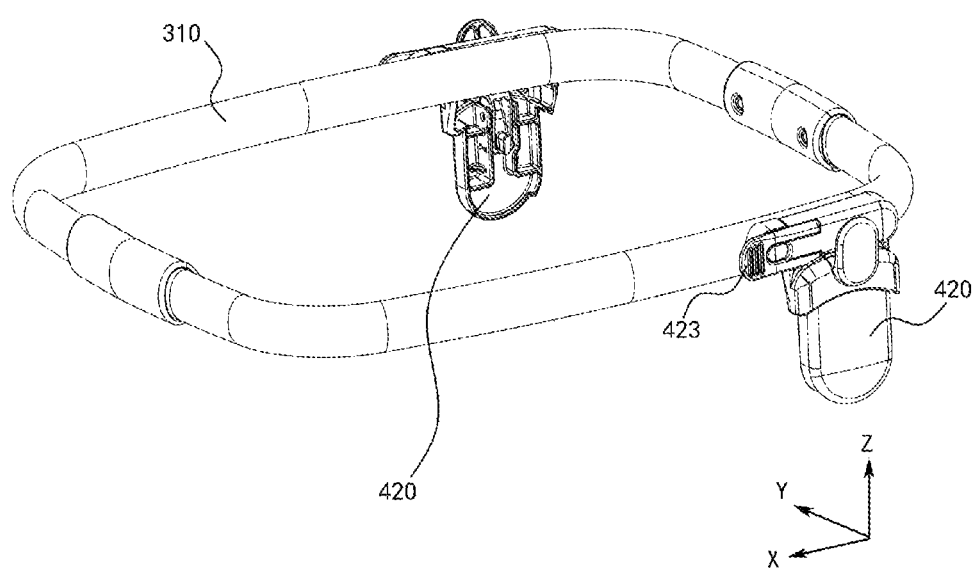
FIG. 10 is a perspective view of a basket support and a basket clamping mechanism of a stroller of another embodiment of the present application.
Figure 11:
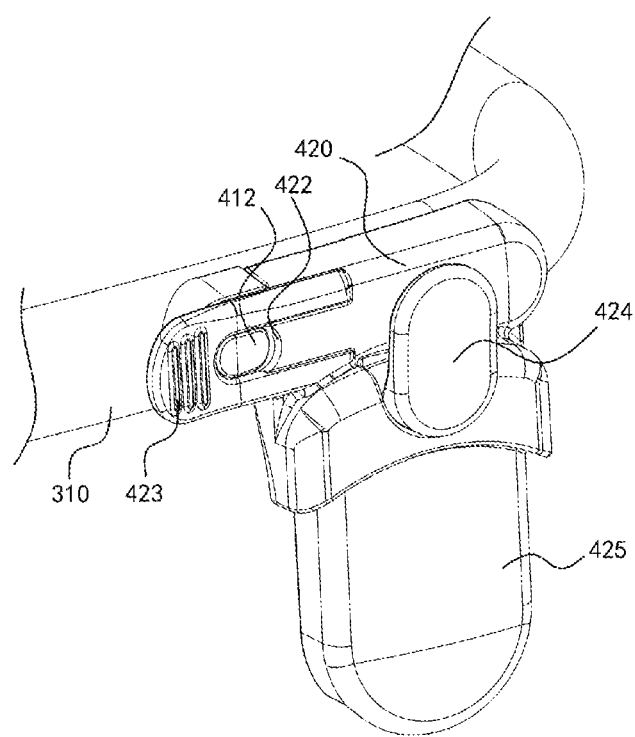
FIG. 11 is a partial perspective view of a basket support and a basket clamping mechanism of a stroller of another embodiment of the present application.
Figure 12:
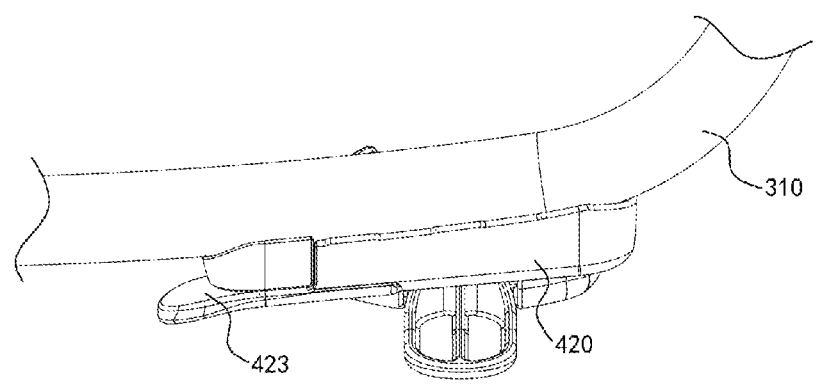
FIG. 12 is a top partial perspective view of a basket support and a basket clamping mechanism of a stroller of another embodiment of the present application.

FIGS. 10-12 show a second embodiment of the present disclosure. Only the differences between the second embodiment and the first embodiment are described below, please refer to the first embodiment for other aspects. Referring to FIGS. 10 to 12, in the second embodiment, a locking member 412 may be formed into an immovable protrusion. The locking member 412 may also be formed at the free end of a cantilever 413 which is the same as in the first embodiment. A clamping base 420 may also include a first operating member 423. The first operating member 423 may be elastically deformed outward with respect to other parts of the clamping base 420. When the clamping base 420 slides on a fixing part 411 in the X-axis direction, the locking member 412 pushes the first operating member 423 outward until the locking member 412 completely enters into the locking hole 422. Then, the first operating member 423 is restored to an initial state due to restoring force of elastic deformation. In this way, the clamping of the clamping base 420 and the locking member 412 is completed. At this time, since the fixing part 411 is located in a clamping groove 421, the fixing part 411 prevents the clamping base 420 from moving in a direction other than the X-axis (as shown in FIG. 10). At the same time, since the locking member 412 is located in the locking hole 422, the fixing part 411 prevents the clamping base 420 from moving in any direction in the plane formed by the X-axis and the Z-axis. Therefore, a clamping member 410 is fixed relative to the clamping base 420. When the clamping base 420 is clamped with the locking member 412, an end of the first operating member 423 extends beyond the clamping member 410, so that the end of the first operating member 423 is easy to be operated, for example, by fingers.

Continuing to refer to FIGS. 10-12, when it is necessary to disengage the clamping member 410 from the clamping base 420, the first operating member 423 may be pulled outward so that the fixing part 411 no longer prevents the clamping base 420 from moving in the negative direction of the X-axis. At the same time, the clamping base 420 is moved in the negative direction of the X-axis, so that the fixing part 411 slides away from the clamping groove 421, so that the clamping member 410 is disengaged from the clamping base 420.

This unlocking method increases an area of the operating part, and the structure is simpler. Through a simple pull, the locking may be released, which is more convenient for users to operate, and the locking member is easier to be released.

Figure 13:
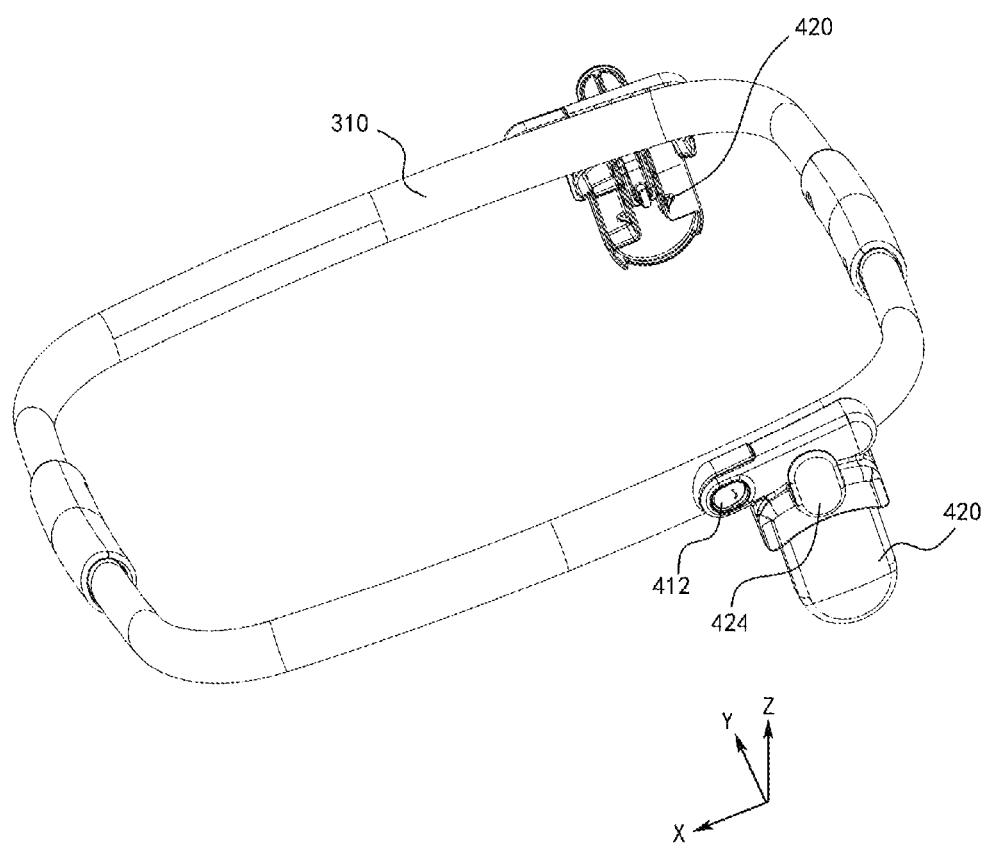
FIG. 13 is a perspective view of a basket support and a basket clamping mechanism of a stroller of yet another embodiment of the present application.
Figure 14:
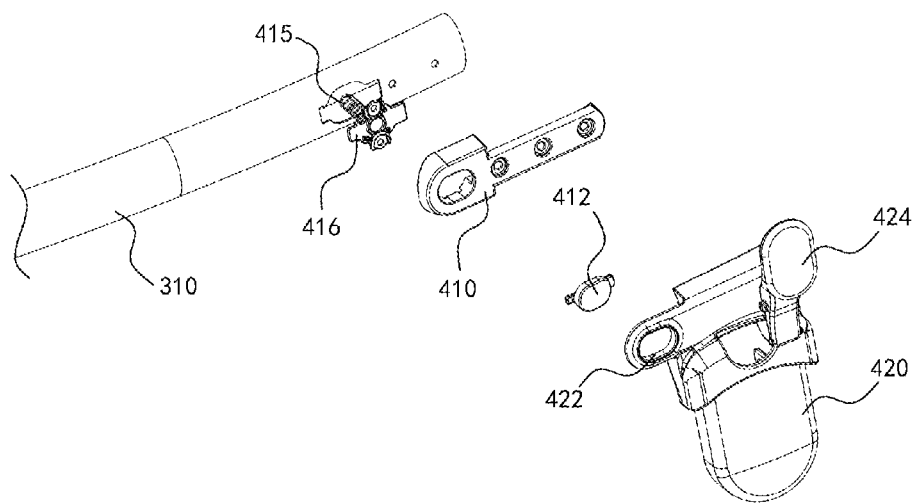
FIG. 14 is a perspective exploded view of a basket support and a basket clamping mechanism of a stroller of yet another embodiment of the present application.

FIGS. 13-14 show a third embodiment of the present disclosure. Only the differences between the third embodiment and the first embodiment are described below, please refer to the first embodiment for other aspects. Referring to FIGS. 13-14, in the third embodiment, a locking member 412 may be formed as a button. A clamping member 410 may not have the cantilever 413, but includes an elastic member 415 and a support cover 416. The locking member 412 may be suspended in an opening of the clamping member 410. The elastic member 415 may be a spring. The support cover 416 may be fixed on an outside of a basket support 310. Both ends of the elastic member 415 are respectively connected to the support cover 416 and the locking member 412, thereby providing thrust to the locking member 412 outwardly. A limit convex piece may be formed on an outside of the clamping member 410 to prevent the locking member 412 from being pushed out by the elastic member 415 to a position completely outside the opening.

Referring to FIG. 13, when a clamping base 420 slides on a fixing part 411 in the X-axis direction, the fixing part 411 is inserted into a clamping groove 421. In this process, the locking member 412 is pressed by the peripheral part of a locking hole 422 to moves towards an inside, causing deformation of the elastic member 415 and storage of restore energy. The clamping base 420 continues to move in the X-axis direction until the fixing part 411 is completely in the locking hole 422. At this time, since the clamping base 420 no longer presses the locking member 412, the locking member 412 returns to the original position due to the restoring force of the elastic member 415. In this way, the clamping of the clamping base 420 and the locking member 412 is completed. At this time, since the fixing part 411 is located in the clamping groove 421, the fixing part 411 prevents the clamping base 420 from moving in a direction other than the X-axis. At the same time, since the locking member 412 is located in the locking hole 422, the fixing part 411 prevents the clamping base 420 from moving in any direction in the plane formed by the X-axis and the Z-axis. Therefore, the clamping member 410 is fixed relative to the clamping base 420.

Continuing to refer to FIG. 13, when it is necessary to disengage the clamping member 410 from the clamping base 420, the locking member 412 may be pushed inward against the elastic force of the elastic member 415, so that the fixing part 411 no longer prevents the clamping base 420 from moving in any direction of the plane formed by the X-axis and the Z-axis. At the same time, the clamping base 420 is moved in the negative direction of the X-axis, so that the fixing part 411 slides away from the clamping groove 421, so that the clamping member 410 is disengaged from the clamping base 420.

This unlocking method is realized by a pressing button with a spring, thus the user may operate more easier, have a better operation experience, release the lock simply and the fixation is reliable.

Figure 15:
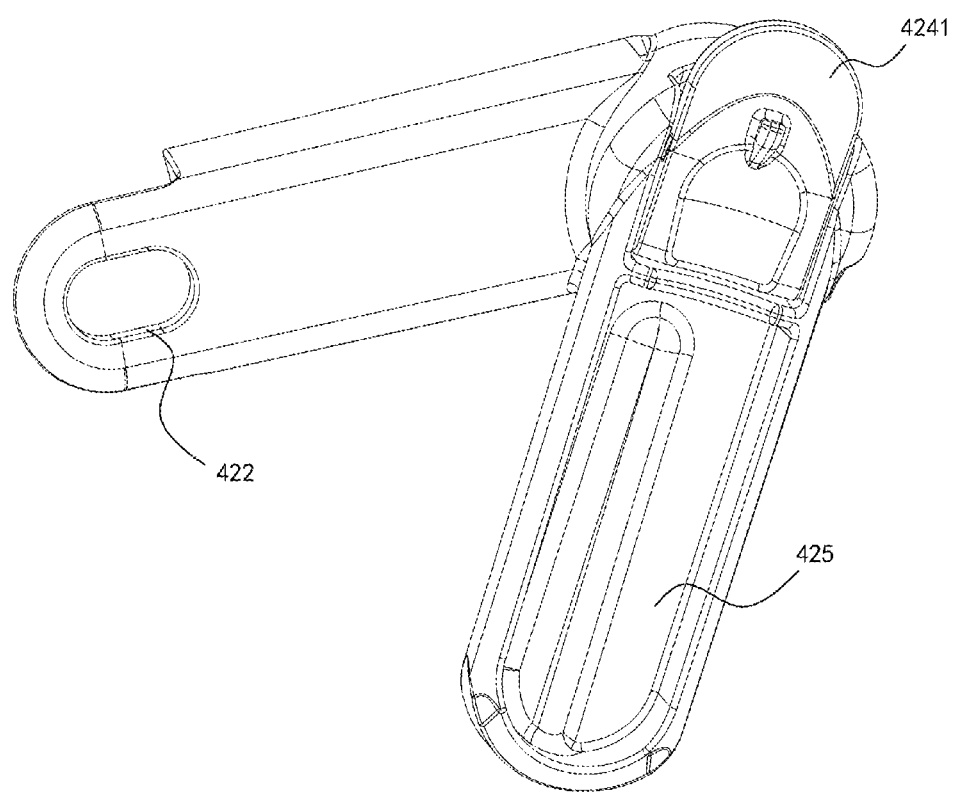
FIG. 15 is a front perspective view of a clamping base of another embodiment of the present application.
Figure 16:
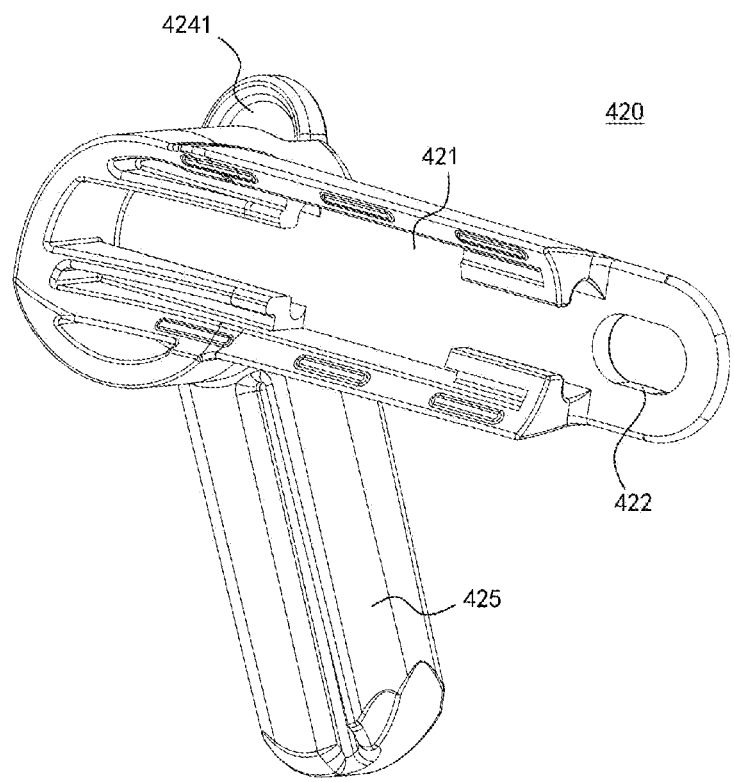
FIG. 16 is a rear perspective view of a clamping base of another embodiment of the present application.

FIGS. 15-17 show a fourth embodiment of the present application. Only the differences between the fourth embodiment and the first embodiment are described below, please refer to the first embodiment for other aspects. Referring to FIGS. 15-17, the insertion part 425 may be at an angle relative to the clamping groove 421, and the angle may not be 90°. When the basket clamping mechanism 40 clamps with the frame 10, the insertion part 425 may not be perpendicular to the ground. Accordingly, the fixing base 110 on the frame 10 is also not perpendicular to the ground (when the stroller 1 is placed on the ground in a use state). Alternatively, the insertion part 425 may rotate relative to a clamping base 420, so that the basket clamping mechanism 40 may adapt to the fixing base 110 in various angles and positions.

In a fifth embodiment of the present application, the basket clamping mechanism 40 may include two types of clamping bases 420 described in the above embodiments. It should be understood that the basket 30 may be connected to the frame 10 through two basket clamping mechanisms 40 (one on the left and one on the right). The two types of clamping bases 420 of each basket clamping mechanism 40 may be, for example, the clamping base 420 as shown in FIG. 6 and the clamping base 420 as shown in FIG. 15. When the basket 30 is connected to the frame 10 of the stroller, one type (a total of two) of the two types of clamping bases 420 (a total of four) may be connected with two clamping members 410 respectively to clamp with the frame 10, or the other type (a total of two) of the two types of clamping bases 420 may be connected with two clamping members 410 respectively to clamp with another type of frame 10. Two clamping bases 420 in each type clamping base 420 may be mirror symmetrical to each other.

Figure 22:
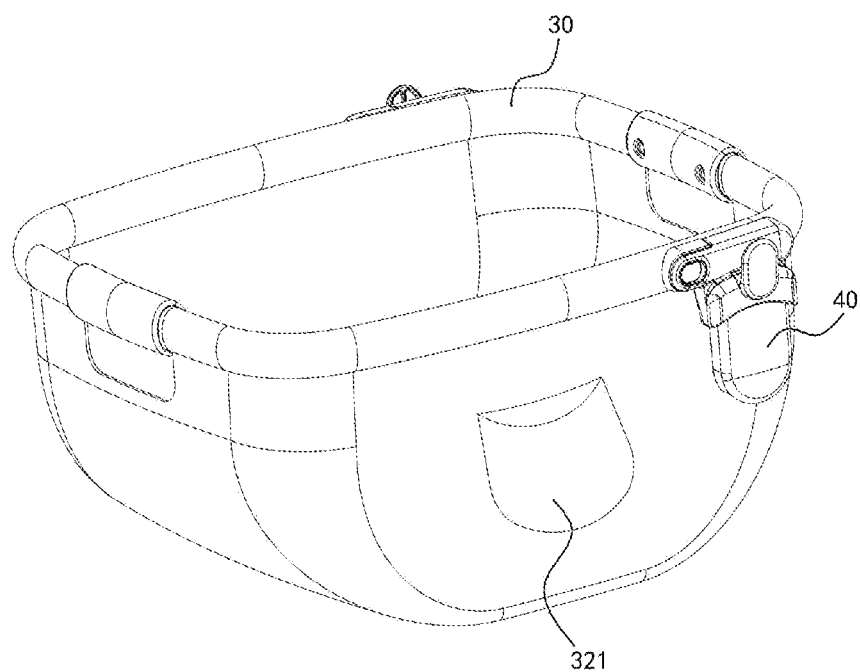
FIG. 22 is a perspective view of a basket and a basket clamping mechanism of a stroller of another embodiment of the present application.

As shown in FIG. 22, a storage bag 321 may be formed on an outside of the containing part 320. When one type of clamping base 420 is used, the other type of clamping base may be placed in the storage bag 321 for storage and prevent from be lost.

After considering the specification and practicing the disclosure disclosed herein, it is easy for those skilled in the art to think of other embodiments of the present application. The present application aims to cover any variation, use or adaptive change of the present application, which follow the general principles of the present disclosure and include common knowledge or customary means in the art not disclosed in the present application. The description and embodiments are only regard as exemplary, and the true scope and spirit of the present application are indicated by the claims of the present application.

Although the present application has been enumerated and described with reference to typical embodiments, the terms used are illustrative and exemplary rather than restrictive. Since the present application may be implemented in various forms without departing from the spirit and essence of the present application, it should be understood that the above embodiments are not limited to any of the foregoing details, but should be interpreted in the broadest scope within the scope of the claims. Therefore, all changes within the scope of the claims or their equivalents should be covered by the claims.

What is claimed is:

1. A basket clamping mechanism for connecting a basket of a stroller to a frame of the stroller, the basket clamping mechanism comprising:
   a clamping member, which is connected to the basket; and
   a clamping base, which is detachably connected with the clamping member and is clamped with the frame,
   wherein the clamping member comprises a locking member and the clamping base comprises a locking hole, when the locking hole is clamped with the locking member, the locking member is located in the locking hole, and
   wherein the clamping member comprises a fixing part and the clamping base comprises a clamping groove, the clamping groove being clamped with the fixing part by sliding on the fixing part, and guiding the locking hole clamping with the locking member.

2. The basket clamping mechanism of claim 1, wherein the locking hole is detachably clampable with the locking member, when the locking hole is disengaged from the locking member, the locking member is separated from the locking hole.

3. The basket clamping mechanism of claim 2, wherein the locking member is actuatable toward a side close to the basket to disengage the locking hole from the locking member.

4. The basket clamping mechanism of claim 2, wherein the clamping base further comprises a first operating member, which extends away from the locking hole and is actuatable toward a side away from the basket to disengage the locking hole from the locking member.

5. The basket clamping mechanism of claim 2, wherein the clamping member further comprises a cantilever, and the locking member is formed at a free end of the cantilever.

6. The basket clamping mechanism of claim 2, wherein the clamping member further comprises an elastic member, which is provided on a side close to the basket of the locking member to apply a restoring force to the locking member away from the basket.

7. A basket clamping mechanism for connecting a basket of a stroller to a frame of the stroller, the basket clamping mechanism comprising:
   a clamping member, which is connected to the basket, the clamping member comprises a locking member and a fixing part; and
   a clamping base, which is detachably connected with the clamping member and is clamped with the frame,
   wherein the clamping base comprises a locking hole and a clamping groove, the clamping groove clamps with the fixing part to prevent the clamping member from moving in a first direction and a second direction relative to the clamping base and allow the clamping base moving in a third direction relative to the clamping member, and the locking hole clamps with the locking member to prevent the clamping member from moving in the first direction, the second direction and the third direction relative to the clamping base, the first direction, the second direction and the third direction being perpendicular to each other.

8. The basket clamping mechanism of claim 7, wherein the clamping groove is clamped with the fixing part by sliding on the fixing part.

9. The basket clamping mechanism of claim 8, wherein the basket comprises a basket support, and the sliding is in an extension direction of the basket support.

10. The basket clamping mechanism of claim 7, wherein the clamping groove is directly buckled on an outside of the fixing part.

11. The basket clamping mechanism of claim 2, wherein the clamping member comprises a clamping groove, the clamping base comprises a fixing part, the clamping groove clamps with the fixing part to prevent the clamping member from moving in a first direction and a second direction relative to the clamping base, and to allow the clamping member to move in a third direction, the first direction, the second direction, and the third direction are perpendicular to each other, and the locking hole clamps with the locking member to prevent the clamping member from moving in the second direction and the third direction relative to the clamping base.

12. The basket clamping mechanism of claim 2, wherein the clamping base further comprises a second operating member, the frame comprises a fixing base, and the second operating member is inserted into the fixing base and clamped with a clamping hole of the fixing base.

13. The basket clamping mechanism of claim 12, wherein the second operating member comprises an operating button, a clamping part and a pivot shaft located between the operating button and the clamping part, so that actuating the operating button clamps the clamping part with the clamping hole or disengages the clamping part from the clamping hole.

14. The basket clamping mechanism of claim 12, wherein the second operating member slides into the fixing base in a vertical direction.

15. The basket clamping mechanism of claim 12, wherein the second operating member slides into the fixing base in a direction inclined relative to a vertical direction.

16. The basket clamping mechanism of claim 1, wherein the basket comprises a basket support and a flexible containing part, the basket support being shaped into a ring shape, the containing part being formed below the basket support.

17. The basket clamping mechanism of claim 16, wherein the clamping member comprises a fixing part detachably connected to the basket support.

18. The basket clamping mechanism of claim 16, wherein a storage bag is formed on an outside of the containing part.

19. The basket clamping mechanism of claim 1, wherein the basket clamping mechanism comprises two types of clamping bases, and the frame comprises two types of frames, one of the two types of clamping bases being connected with the clamping member so as to clamp with one of the two types of frames, or the other of the two types of clamping bases being connected with the clamping member so as to clamp with the other of the two types of frames, wherein, each of the two types of clamping bases comprises two clamping bases, and the clamping members are two clamping members.

20. A stroller, wherein the stroller comprises a frame, a basket and the basket clamping mechanism of claim 1.

21. The stroller of claim 20, wherein the stroller comprises two basket clamping mechanisms, and the two basket clamping mechanisms are connected to both sides of the basket respectively.

\* \* \* \* \*